United States Patent
Yao et al.

(10) Patent No.: US 7,565,442 B1
(45) Date of Patent: Jul. 21, 2009

(54) METHOD AND SYSTEM FOR SUPPORTING DISTANCE EXTENSION IN NETWORKS HAVING Y-CABLE PROTECTION

(75) Inventors: Gongyuan Yao, Germantown, MD (US); William Miller, Herndon, VA (US); Lee Shombert, Herndon, VA (US); Fang Gao, Rockville, MD (US); John Diab, Santa Rosa, CA (US); Ravi Singhal, Herndon, VA (US); Stephane Muszynski, Washington, DC (US); Ganesh Sundaram, Rohnert Park, CA (US); Thomas Eric Ryle, Raleigh, NC (US); Hitesh Amin, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 652 days.

(21) Appl. No.: 11/147,488

(22) Filed: Jun. 8, 2005

(51) Int. Cl.
G06F 15/16 (2006.01)
H04J 3/16 (2006.01)

(52) U.S. Cl. ....................... 709/237; 370/437

(58) Field of Classification Search ............... 709/223, 709/251, 237, 219; 714/4; 370/395.51, 537, 370/437
See application file for complete search history.

(56) References Cited

U.S. PATENT DOCUMENTS

| | | | |
|---|---|---|---|
| 5,610,745 A | 3/1997 | Bennett | |
| 5,638,518 A | 6/1997 | Malladi | |
| 5,941,972 A | 8/1999 | Hoese et al. | |
| 5,959,994 A | 9/1999 | Boggs et al. | |
| 6,393,489 B1 | 5/2002 | Sambamurthy et al. | |
| 6,400,730 B1 | 6/2002 | Latif et al. | |
| 6,636,529 B1 | 10/2003 | Goodman et al. | |
| 6,735,215 B1 * | 5/2004 | Cao | 370/437 |
| 6,748,502 B2 * | 6/2004 | Watanabe et al. | 711/158 |
| 6,970,451 B1 * | 11/2005 | Greenberg et al. | 370/352 |
| 2002/0176450 A1 | 11/2002 | Kong et al. | |
| 2003/0074449 A1 | 4/2003 | Smith et al. | |
| 2003/0091037 A1 | 5/2003 | Latif et al. | |
| 2003/0172319 A1 * | 9/2003 | Ryhorchuk et al. | 714/27 |
| 2003/0218981 A1 | 11/2003 | Scholten | |
| 2004/0008719 A1 * | 1/2004 | Ying | 370/460 |
| 2004/0030766 A1 * | 2/2004 | Witkowski | 709/223 |

(Continued)

OTHER PUBLICATIONS

Cisco Documentation; Configuring APS; Jun. 2, 2004; 1992-2004 Cisco Systems; pp. 9-10.*

(Continued)

Primary Examiner—J Bret Dennison
(74) Attorney, Agent, or Firm—Cindy Kaplan

(57) ABSTRACT

A method and system for communicating state information between a local device and a remote device across a transport network is disclosed. Each of the local and remote devices operate independently from one another and at least one of the devices is configured for one-way traffic protection. The method includes receiving a protection message comprising K-bytes from one of the local and remote devices at the other of the local and remote devices and determining based on the received K-bytes, if there is a change in state at one of the devices. If a change in state is detected, a message is sent indicating the change in state from one of the local and remote devices to the other of the local and remote devices.

20 Claims, 4 Drawing Sheets

U.S. PATENT DOCUMENTS

| | | |
|---|---|---|
| 2004/0076175 A1 | 4/2004 | Patenaude |
| 2004/0085902 A1 | 5/2004 | Miller et al. |
| 2004/0085904 A1 | 5/2004 | Bordogna et al. |
| 2005/0002338 A1 | 1/2005 | Devdas et al. |
| 2005/0163168 A1* | 7/2005 | Sheth et al. ................. 370/537 |
| 2006/0087975 A1* | 4/2006 | Zheng et al. ................. 370/241 |

OTHER PUBLICATIONS

Generic Framing Procedure ITU-T G.7041; Agilent Technologies, Inc. 2002; Jul. 23, 2002; p. 5.*

* cited by examiner

METHOD AND SYSTEM FOR SUPPORTING DISTANCE EXTENSION IN NETWORKS HAVING Y-CABLE PROTECTION

BACKGROUND OF THE INVENTION

The present invention relates generally to data networking and, more specifically, to Y-cable protection enhancement in supporting Fibre Channel distance extension.

SONET/SDH and optical fiber have emerged as significant technologies for building large scale, high speed, Internet Protocol (IP) based networks. SONET, an acronym for Synchronous Optical Network, and SDH, an acronym for Synchronous Digital Hierarchy, are a set of related standards for synchronous data transmission over fiber optic networks. SONET/SDH is currently used in wide area networks (WAN) and metropolitan area networks (MAN). A SONET system consists of switches, multiplexers, and repeaters, all connected by fiber. The connection between a source and destination is called a path.

One network architecture for the network interconnection of computer devices is Fibre Channel, the core standard of which is described in ANSI (American National Standards Institute) X3.230-1994. The Fibre-Channel standard defines a bi-directional link protocol, used to connect computers to disk drives and other peripherals. Arising out of data storage requirements, Fibre Channel currently provides for bi-directional gigabit-per-second transport over communication networks in Fibre Channel frames that consist of standardized sets of bits used to carry data over the network system. Fibre Channel links are limited to no more than 10 kilometers.

New standards and protocols have emerged to combine the advantages of the SONET/SDH and Fibre Channel technologies. For example, it is sometimes desirable to link two SANs (Storage Area Networks), which operate with Fibre Channel protocol, over a MAN (Metropolitan Area Network), or even a WAN (Wide Area Network), which typically operates under SONET or SDH standards. The advent of high data rate metropolitan optical networks including such networks based on the use of dense wave division multiplexing (DWDM) and/or SONET/SDH transport systems makes it possible to extend so-called storage area networks (SANs) that carry multiple Fibre-Channel links over distances much longer than 10 kilometers. This extension of Fibre Channel from 100 kilometers to over several hundred, or even thousand, kilometers, is made by mapping Fibre Channel ports to a SONET/SDH path for transport across a SONET/SDH network.

Y-cable protection scheme in Fibre Channel is designed as one way traffic protection. Near End (NE) equipment and Far End (FE) equipment within a network can provision Y-cable differently and can act independently. This means that NE and FE equipment may be in different configurations and in different states (e.g., Manual Switch/Forced Switch/Reverse Request, Active/Standby State, Working/Protect, etc.). Due to the nature of Fibre Channel, when Fibre Channel Distance Extension (DE) is enabled, DE control state machine has to be working only with bi-directional traffic. This requires the NE trunk to communicate with the FE trunk over a SONET path and both receive and transmit Fibre Channel traffic have to go through the same path (trunk).

There is, therefore, a need for a method and system that allows Distance Extension, or other features requiring bi-directional traffic, to function properly in networks configured for one-way traffic protection such as Y-cable protection.

SUMMARY OF THE INVENTION

A method and system for communicating state information between a local device and a remote device across a transport network are disclosed. Each of the devices operate independently from one another and at least one of the devices is configured for one-way traffic protection. The method includes receiving a protection message comprising K-bytes from one of the local and remote devices at the other of the local and remote devices and determining, based on the received K-bytes, if there is a change in state at one of the devices. If a change in state is detected, a message is sent indicating the change in state from one of the local and remote devices to the other of the local and remote devices.

In another aspect of the invention, a computer program product for communicating between a local device and a remote device across a transport network generally comprises: code that receives a protection message comprising K-bytes from one of the local and remote devices at the other of the local and remote devices; code that determines if there is a change in state at one of the devices; if a change in state is detected, code that sends a message indicating the change in state from one of local and remote devices to the other of local and remote devices; and a computer-readable storage medium that stores the codes.

Further understanding of the nature and advantages of the inventions herein may be realized by reference to the remaining portions of the specification and the attached drawings.

BRIEF DESCRIPTION OF THE DRAWINGS

FIG. 3 is illustrates details of K-byte compression according to one embodiment of the present invention.

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system of the present invention allow Distance Extension to function properly in networks configured for Y-cable protection. As previously discussed, NE (Near End) and FE (Far End) equipment can provision Y-cable protection differently and act independent from one another, resulting in the equipment having different configurations or protection states. This may cause problems when Fibre Channel Distance Extension (DE) is enabled since a DE control state machine works only with bi-directional traffic. It is to be understood that Fibre Channel Distance Extension is only one example and that the invention may be used with other features that require NE and FE equipment, which may be operating in different configurations or states (due to Y-cable protection or other one-way traffic protection schemes), to communicate with bi-directional traffic going through the same path.

As described in detail below, the present invention passes information between the NE and FE equipment so that they can communicate with each other and determine whether they need to change protection states or take other action, such as initiate an alarm. In one embodiment, a SONET protection K-byte scheme, as described in GR-253 "Generic Requirements for Synchronous Optical Network (SONET) Transport Systems", is used to allow NE and FE equipment to communicate with each other and make state change decisions accordingly or raise alarms in DE enabled mode. The invention may be implemented, for example, in a Muxponder 2.5 G card over a SONET/SDH network.

Figure 1A:
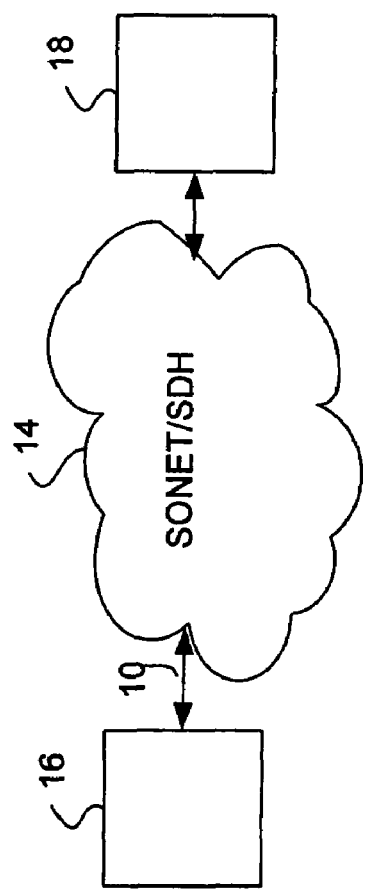
FIG. 1A depicts a network architecture to which embodiments of the present invention may be applied.

Referring now to the drawings, and first to FIG. 1A, an exemplary network is shown with Fibre Channel ports connected over a SONET/SDH transport network. In the present example, the ports operate under Fibre Channel protocol. It is to be understood, however, that the ports may also operate under other frame-based protocols, such as gigabit Ethernet, in accordance with the present invention.

A bi-directional link 10 interconnects Fibre-Channel ports coupled to Near End equipment (local device) 16 and Far End equipment (remote device) 18, carrying Fibre-Channel frames encapsulated within packets. It is to be understood that either device may be referred to as a local device with the other device referred to as a remote device. The link 10 can be either an actual physical link or a tunnel through a network cloud (e.g., SONET/SDH network 14). The SONET/SDH network 14 provides a transport path to connect the NE equipment 16 to the FE equipment 18. Optical transport platforms such as ONS 15454 (available from Cisco Systems, Inc. of San Jose, Calif.), may be used to provide the interface between the Fibre Channel and SONET/SDH networks.

Transport network interfaces interface Fibre-Channel ports at equipment 16, 18 to bi-directional link 10. The Fibre Channel ports are associated with elements which are interconnected by Fibre Channel. These elements include data storage elements, including disk drive arrays, RAIDs, disk farms, or possibly Fibre Channel network elements, such as routers, switches, or other Fibre Channel network elements.

GFP (Generic Framing Protocol) may be used as the framing protocol for such a network for encapsulating the Fibre Channel payloads at one end of the SONET/SDH network 14 to be transmitted across the SONET/SDH network and for decapsulating the Fibre Channel data at the other end. In one embodiment, data is transferred through GFP messages, as described in U.S. Patent Application Publication No. 20050002338 (Devdas et al., filed Jan. 6, 2005), which is incorporated herein by reference in its entirety. It is to be understood that GFP is only one example of a protocol that may be used to transfer the K-bytes and that other protocols may be used without departing from the scope of the invention.

Figure 1B:
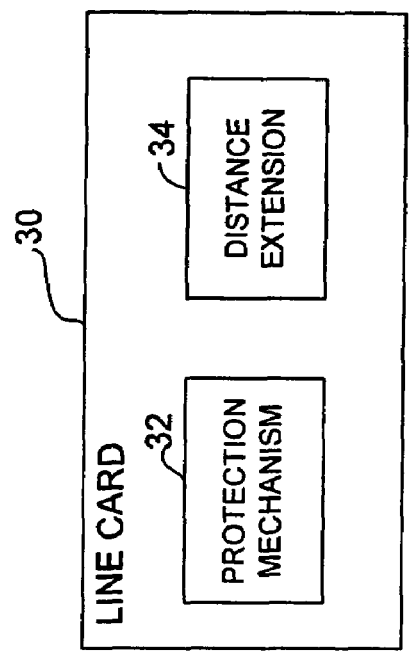
FIG. 1B is a block diagram illustrating details of a line card of one of the nodes of the network shown in FIG. 1A.

FIG. 1B illustrates detail of one embodiment of a line card 30 (e.g Input/Output (I/O) card) located at the NE and FE equipment 16, 18 and configured to implement the present invention. The line card 30 includes a protection mechanism 32 and a distance extension mechanism 34. The protection mechanism 32 includes a switch agent which sends control commands to a driver. The distance extension mechanism comprises a Buffer to Buffer (B2B) state machine which operates to receive K-bytes from the driver and create messages identifying the state of the equipment coupled to the line card. As described below, software in NE and FE equipment 16, 18 uses these K-bytes to communicate with each other to determine whether there is need to do a protection switch or raise alarms.

Figure 2:
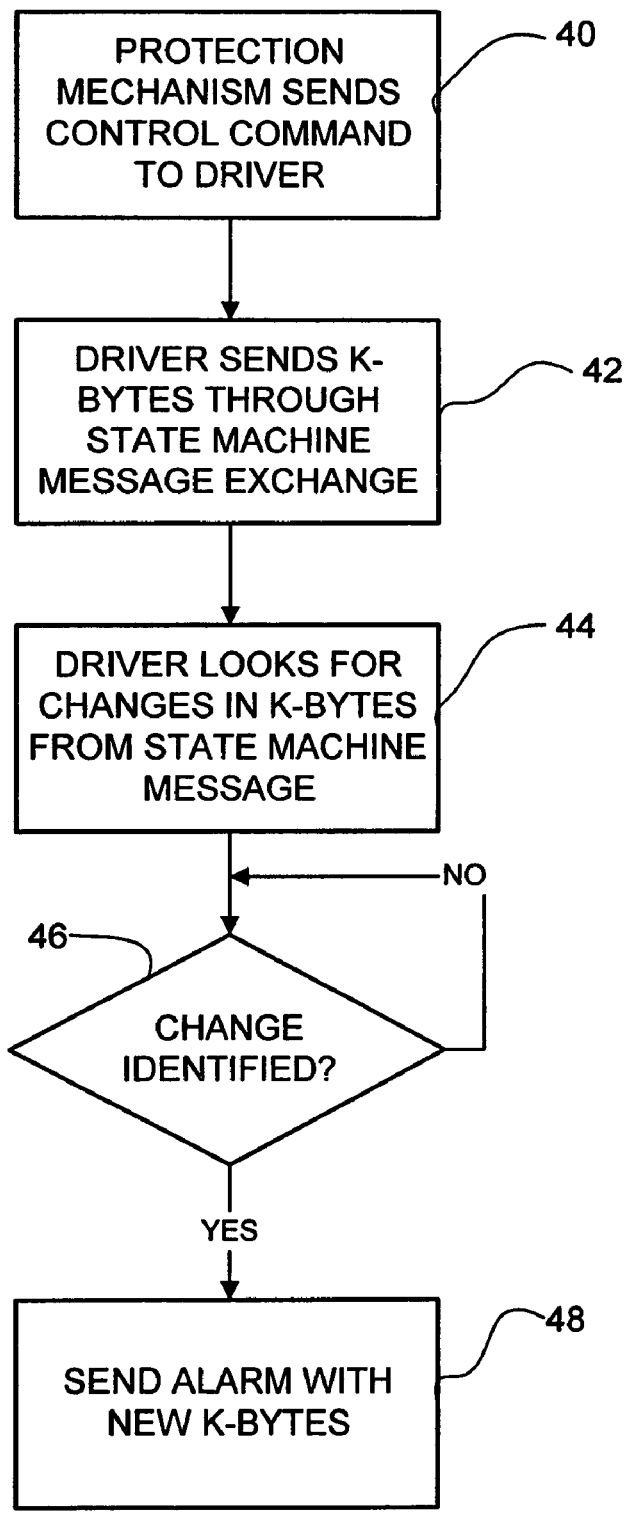
FIG. 2 is a flowchart illustrating a process of the present invention for passing state information between NE and FE equipment in Distance Extension enabled mode.

FIG. 2 is a flowchart illustrating a process of the present invention for passing information between NE and FE equipment 16, 18 for Y-cable protection in Distance Extension enabled mode. At step 40, the protection mechanism 32 sends control commands to the driver to give K-bytes to transmit when needed. The driver sends these K-bytes through a state machine message exchange in the distance extension mechanism 34 (step 42). The protection mechanism polls the messages at set intervals (e.g., every 5 ms) to see if there are any changes in K-bytes from the protection mechanism's message (step 44). If there is a change in state, an alarm may be set, a message may be sent back to the other device, or both actions may occur (steps 46 and 48). For example, when one of the devices 16, 18 receives a K-byte message and identifies a state change, the device may raise alarms and send an updated K-byte message back. The protection mechanisms 32 at the NE and FE equipment 16, 18 then communicate to determine which device should change its state or configuration or other action to be taken, such as raise an alarm.

Examples of an internal User Defect Alarm that may be used to inform the switch agent of K-byte changes are as follows:

USER_K1_BYTE_CHANGE
USER_K2_BYTE_CHANGE

In one embodiment, a 16 bit message is used to pass information between the FE and NE equipment card. In one example, 4 bits are reserved for future state machine use and 12 bits are used for K-byte handling.

Figure 3:
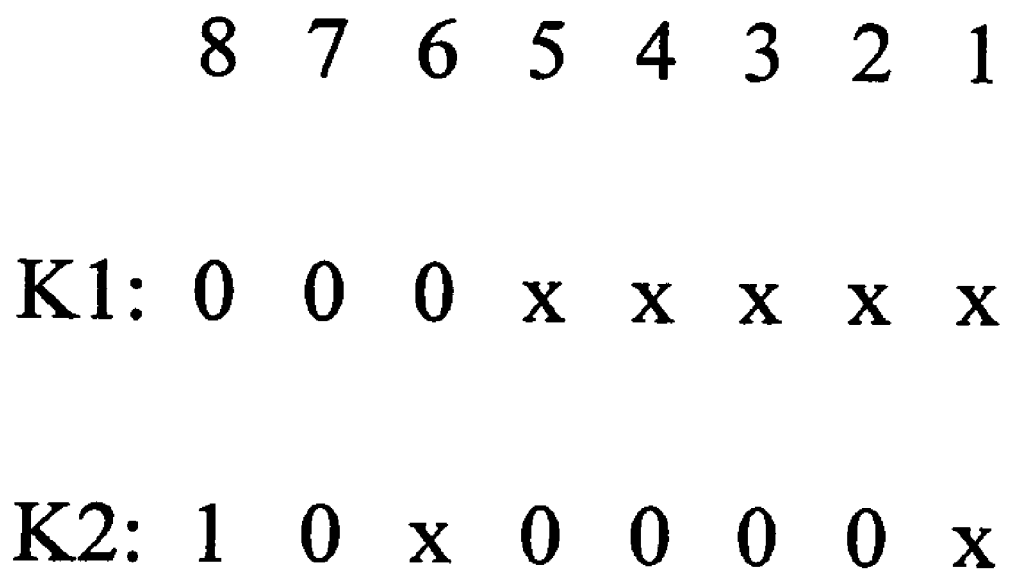

K-byte compression is preferably implemented as shown in FIG. 3. The compression is based on the following:

K1, bits 5-8 indicate the requesting channel.
K2, bits 1-4 indicate the current channel.
K2, bit 5 chooses between 1+1 and 1:n.
K2, bits 6-8 indicate the operating mode.

In one example, two channels are used so only one bit is needed for bits 5-8 of K1 and 1-4 of K2. If only 1+1 protection is used, zero bits are needed for bit 5 of K2. If only two codes are defined for the operating mode (e.g., unidirectional and bi-directional), only one bit is needed for bits 6-8 of K2.

Figure 4:
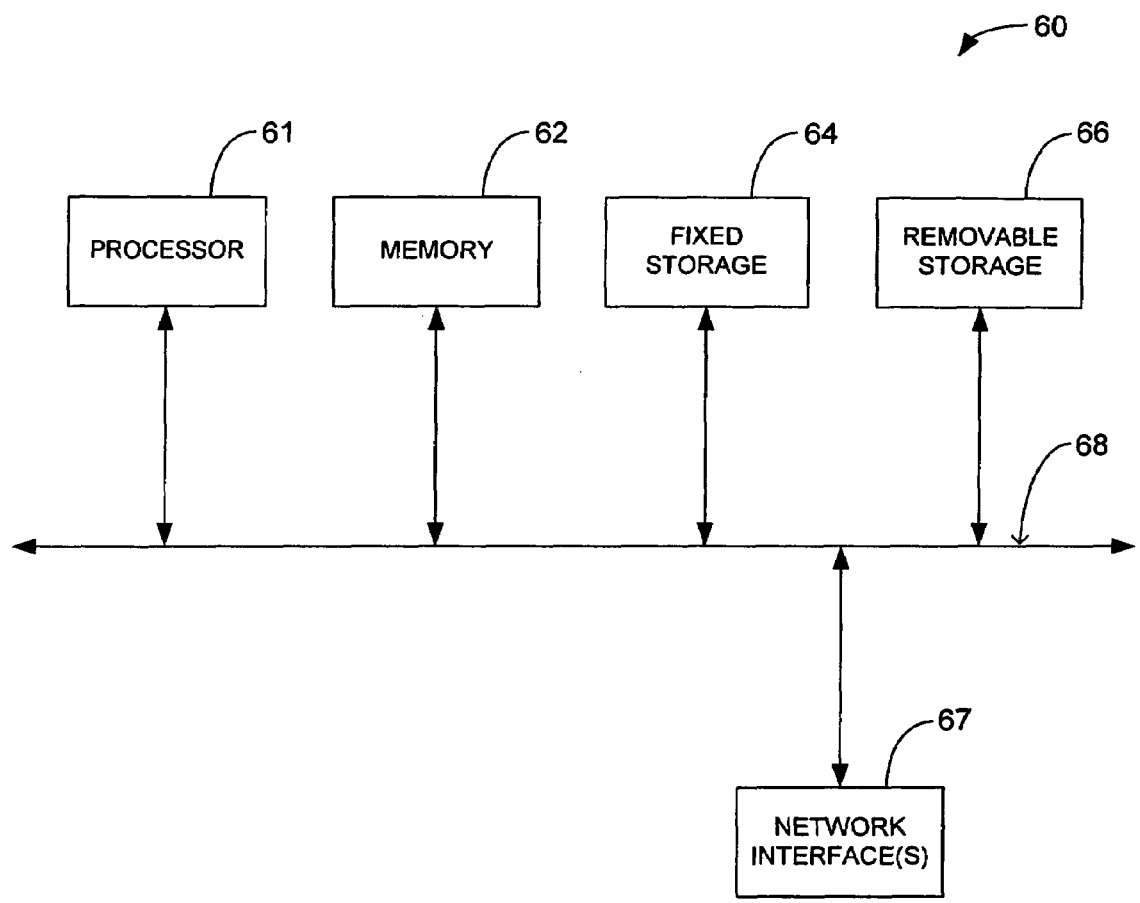
FIG. 4 is block diagram of a computer system that can be utilized to execute software of an embodiment of the present invention.

FIG. 4 shows a system block diagram of computer system 60 that may be used to execute software of an embodiment of the invention. The computer system 60 includes memory 62 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 60 further includes subsystems such as a central processor 61, fixed storage 64 (e.g., hard drive), removable storage 66 (e.g., CD-ROM drive), and one or more network interfaces 67. Other computer systems suitable for use with the invention may include additional or fewer subsystems. For example, computer system 60 may include more than one processor 61 (i.e., a multi-processor system) or a cache memory.

The system bus architecture of computer system 60 is represented by arrows 68 in FIG. 4. However, these arrows are only illustrative of one possible interconnection scheme serving to link the subsystems. For example, a local bus may be utilized to connect the central processor 61 to the system memory 62. Computer system 60 shown in FIG. 4 is only one example of a computer system suitable for use with the invention. Other computer architectures having different configurations of subsystems may also be utilized. Communication between computers within the network is made possible with the use of communication protocols, which govern how computers exchange information over a network.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method for communicating state information between a local device and a remote device across a transport network, each of said devices operating independently from one another, the method comprising:
   enabling Fibre channel distance extension;
   receiving a protection message comprising K-bytes from one of the local and remote devices at the other of the local and remote devices, the local and remote devices configured for Y-cable, one-way traffic protection between the local and remote devices; identifying a state at the device receiving said protection message based on a Fibre channel distance extension state machine;
   determining based on the received K-bytes and the identified state, if there is a change in state at one of the devices; and
   if a change in state is detected, sending a message indicating the change in state from one of the local and remote devices to the other of the local and remote devices.

2. The method of claim 1 wherein the transport network is a SONET/SDH network.

3. The method of claim 1 wherein the local and remote devices are in communication with Fibre Channel ports.

4. The method of claim 1 wherein receiving a protection message comprises receiving a 16 bit message.

5. The method of claim 1 wherein sending a message comprises performing K-byte compression on data contained in the message.

6. The method of claim 1 wherein sending a message comprises sending K-bytes through GFP messages.

7. The method of claim 1 wherein the local and remote devices comprise Fiber Channel interfaces.

8. A computer-readable storage medium encoded with a computer program for communicating state information between a local device and a remote device across a transport network, the computer program comprising:
   code that enables Fibre channel distance extension;
   code that receives a protection message comprising K-bytes from one of the local and remote devices at the other of the local and remote devices, the local and remote devices configured for Y-cable, one-way traffic protection between the local and remote devices;
   code that identifies a state at the device receiving said protection message based on a Fibre channel distance extension state machine;
   code that determines based on the received K-bytes and the identified state if there is a change in state at one of the devices; and
   if a change in state is detected, code that sends a message indicating the change in state from one of local and remote devices to the other of local and remote devices.

9. The computer-readable storage medium of claim 8 wherein the transport network is a SONET/SDH network.

10. The computer-readable storage medium of claim 8 wherein the local and remote devices are in communication with Fibre Channel ports.

11. The computer-readable storage medium of claim 8 wherein code that sends a message comprises code that performs K-byte compression on data contained in the message.

12. The computer-readable storage medium of claim 8 wherein code that sends a message comprises code that sends K-bytes through GFP messages.

13. The method of claim 1 wherein said first and second devices are Fibre Channel devices.

14. The method of claim 1 wherein the transport network is a SONET/SDH network and transmitting said message comprises transmitting a GFP message.

15. The method of claim 1 wherein said first and second devices are Ethernet devices.

16. The computer-readable storage medium of claim 8 wherein the transport network is a SONET/SDH network and code for transmitting said messages comprises code for encapsulating a Fibre Channel payload in a Generic Framing Protocol message.

17. An apparatus comprising:
   a protection mechanism configured for Y-cable, one-way traffic protection between the apparatus and a far end Fibre channel device;
   an extension mechanism configured for Fibre Channel distance extension and creating messages identifying a state of the apparatus;
   a driver configured to receive control commands from the protection mechanism and transmit K-bytes to the extension mechanism based on the control commands received from the protection mechanism; and
   a memory storing said protection mechanism, said extension mechanism, said driver, said state of the apparatus, said control commands, and said K-bytes;
   wherein the apparatus is configured to communicate with the far end Fibre channel device upon identifying a change in state at the apparatus and determine whether a change in state or configuration is required at the apparatus.

18. The apparatus of claim 17 further comprising a switch agent configured for receiving notification of a change in state from the extension mechanism and notifying the protection mechanism.

19. The apparatus of claim 17 wherein the apparatus is configured to encapsulate messages in Generic Framing Protocol to communicate with the far end Fibre channel device.

20. The apparatus of claim 17 wherein the extension mechanism comprises a buffer to buffer state machine message exchange configured to exchange messages with the driver.

\* \* \* \* \*